United States Patent [19]
Chin et al.

[11] Patent Number: 5,825,775
[45] Date of Patent: Oct. 20, 1998

[54] METHOD AND APPARATUS FOR MANAGING AN INTEGRATED ROUTER/HUB

[75] Inventors: Jeffrey A. Chin, Belmont; Leon Y.K. Leong, Monte Sereno; Frank S. Lee, Santa Clara, all of Calif.

[73] Assignee: Bay Networks, Inc., Santa Clara, Calif.

[21] Appl. No.: 825,410

[22] Filed: Mar. 27, 1997

Related U.S. Application Data

[63] Continuation of Ser. No. 339,472, Nov. 14, 1994, abandoned.

[51] Int. Cl.$^6$ .................................................. H04C 12/66
[52] U.S. Cl. ......................... 370/401; 370/402; 370/465; 370/911; 395/200.11; 395/309
[58] Field of Search ..................................... 370/400, 401, 370/402, 246, 252, 463, 465, 469, 502, 911; 395/309, 200.11

[56] References Cited

U.S. PATENT DOCUMENTS

| | | | |
|---|---|---|---|
| 5,295,244 | 3/1994 | Dev et al. | 395/161 |
| 5,432,907 | 7/1995 | Picazo, Jr et al. | 395/200.79 |
| 5,500,934 | 3/1996 | Austin et al. | 395/755 |
| 5,715,394 | 2/1998 | Jabs | 370/401 |

OTHER PUBLICATIONS

"Network Management; Cabletrod integrates Cisco Los throughout entire line of Intelligent Hubs; products unveiled for end–to–end Enterprise routing," Edge, on & about AT&T vol. 10, No. 349, p. 24, Apr. 3, 1995.
"Token ring : New Token Ring Rrouter/Hub Combo from Cisco Cuts Cost; Complexity of Remote Access in IBM environments", Edge: Work–Group Computing Report, vol. 6, No. 262, p. 50, May 29, 1995.
"One–box ISDN Solution: cost effective Xyplex hub/router line meets branch–Office needs," PC Week, vol. 12, No. 1, PNI, Jan 9, 1995.
Wygant, "Cisco connects token–ring to the Internet", PC Magazine, vol. 14, No. 14 P. NE 47, Aug. 1995.
Wallace, "Cisco takes aim at remote Office communications LAN Extenders, Access Server Models Shown", Infoworld, vol. 16, No. 38 p. 8, Sep. 19, 1994.
Wallace, "ACC Shipping Low–Cost hub/router combination; Danube links remote, Central Sites," Infoworld, vol. 16, No. 40, p. 43, Oct. 3, 1994.
Network Computing V5, N3 P. 154 Mar. 1, 1994.
Software Magazine V13, N2, P. 23 Jan 15, 1993.

*Primary Examiner*—Benedict V. Safourek
*Assistant Examiner*—Seema S. Rao
*Attorney, Agent, or Firm*—Blakey, Sokoloff, Taylor & Zafman, LLP

[57] ABSTRACT

A method and apparatus for generating a display containing information about both the local and remote traffic handled by an integrated router/hub is provided. An integrated router/hub routes local messages between devices on a first local area network, and routes remote messages between the first local area network and a second local area network. The integrated router/hub stores a first set of values related to the local messages, and a second set of values related to the remote messages. A network management station executes a network management application the includes instructions which cause the network management station to generate a display of the information stored in the integrated router/hub. In response to user input, the network management station requests the information from the integrated router/hub, receives the information from the integrated router/hub, and generates the display of the information. The display may include charts that illustrate statistics derived from the information.

17 Claims, 3 Drawing Sheets

METHOD AND APPARATUS FOR MANAGING AN INTEGRATED ROUTER/HUB

This is a continuation of application Ser. No. 08/339,472, filed Nov. 14, 1994, now abandoned.

FIELD OF THE INVENTION

The present invention relates to a method and apparatus for displaying information about a network, and more specifically, to a method and apparatus for displaying both (1) information about messages sent between stations on a local area network through an integrated router/hub and (2) information about messages sent between local area networks through the integrated router/hub.

BACKGROUND OF THE INVENTION

To increase productivity, many companies have connected previously-isolated computer devices ("stations") to allow inter-device communication. A communication network that links a number of stations in the same "local" area, such as the same building or plant, is known as a local area network ("LAN"). Messages sent between stations which belong to the same LAN are referred to as "local messages".

Hubs are devices designed to route messages between the stations within a LAN. For example, a LAN may consist of five stations connected to an intelligent hub. When a message is sent from one station to another, the sending station transmits the message to the intelligent hub and the intelligent hub forwards the message to the designated receiving station.

Larger companies may operate a variety of LANs. For example, a single company X may have stations at one plant connected to form a first LAN, stations at a second plant connected to form a second LAN, and stations at company headquarters connected to form a third LAN.

To further increase productivity, LANs may be connected to other LANs to allow communication between stations that belong to different LANs. A network system that consists of multiple LANs in generally referred to as a wide area network ("WAN"). Messages sent between stations that belong to different LANs are referred to as "remote messages".

For example, the first, second and third LANs of company X may be connected to form a single WAN. Consequently, a user of a station in the company headquarters may send remote messages to stations in the first or second plant as well as local messages to other stations in the company headquarters.

Routers are devices designed to handle the communication between LANs. For example, the following process may be performed to transmit a message from a station on a first LAN to a station on a second LAN. First, the station on a first LAN sends a message to an intelligent hub on the first LAN. The intelligent hub on the first LAN sends the message to a router on the first LAN. The router on the first LAN sends the message to a router on the second LAN. The router on the second LAN sends the message to an intelligent hub on the second LAN. Finally, the intelligent hub on the second LAN sends the message to the designated destination station on the second LAN.

Hub operations typically involve the physical layer of a network, while router operations typically involve the network layer of a network. Thus, a hub will keep track of how many local messages contained bit errors, while a router will keep track of the service (e.g. E-mail or file transfer) corresponding to each remote message.

The communications between routers that belong to different LANs are typically transmitted according to a different protocol than communications between stations that belong to the same LAN. Different protocols are employed to address the specific needs of each type of communication. For example, a remote message typically travels a much greater distance than a local message. Because of the greater distance, there is a higher likelihood of error in the transmission. Therefore, protocols for sending remote messages typically have more robust error handling mechanisms than protocols for sending local messages.

As the complexity of networks has increases, it becomes increasingly important to have tools to easily monitor and maintain networks. Consequently, network management applications have been developed which, when executed on a station of a network, gather and display data related to the network. For example, U.S. Pat. No. 5,226,120 entitled Apparatus and Method of Monitoring the Status of a Local Area Network describes a network management station which visually depicts intelligent hubs ("concentrators") connected in a LAN.

Recently, integrated router/hubs have been developed. Integrated router/hubs are devices which perform the remote message handling traditionally provided by routers as well as the local message handling traditionally provided by intelligent hubs. For example, an integrated router/hub may serve as the intelligent hub for a group of stations in a first LAN while serving as the router to send messages between the first LAN and a second LAN.

Current network management programs manage either intelligent hubs or routers. Consequently, if a user desires to display information about the local messages handled by a given integrated router/hub, then the user must run a network management program which manages intelligent hubs. Within the intelligent hub management program, a user then selects an intelligent hub identifier corresponding to the integrated router/hub. In response, the network management program sends a message to the integrated router/hub requesting the local message information. In response to the request, the integrated router/hub sends the requested information back to the network management program. The network management program then displays the local message information.

Similarly, if a user desires to display information about the remote messages handled by a given integrated router/hub, then the user must run a network management application which manages routers. Within the router management program, the user selects a router identifier corresponding to the integrated router/hub. In response, the network management program sends a message to the integrated router/hub requesting the remote message information. In response to the request, the integrated router/hub sends the requested information back to the network management program. The network management program then displays the remote message information.

This method of treating an integrated router/hub as two separate devices has numerous disadvantages. First, topological displays of the network will be inaccurate. In some displays an integrated router/hub may be shown as an intelligent hub. In other displays the integrated router/hub may be shown as a router. In yet other displays the integrated router/hub may be shown as two devices, an intelligent hub and a router.

A second disadvantage is that two operations must be performed to acquire all of the communication information from an integrated router/hub. Specifically, two network management programs must be invoked, two display operations must be initiated, two messages must be sent to the integrated router/hub, two messages must be returned from the integrated router/hub, and two statistics windows must be displayed.

SUMMARY OF THE INVENTION

According to one embodiment of the invention, a network system including a first local area network and a second local area network is provided. The first local area network includes a integrated router/hub coupled to the second local area network, and a plurality of stations coupled to the integrated router/hub.

The integrated router/hub processes a first set of messages communicated between the plurality of stations. The integrated router/hub stores a first set of values relating to the first set of messages. The integrated router/hub processes a second set of messages communicated between the first local area network and the second local area network. The integrated router/hub stores a second set of values relating to the second set of messages.

The plurality of stations includes a network management station having a display device. The network management station executes a network management application which causes the network management station to retrieve the first set of values and the second set of values from the integrated router/hub in response to user input. The network management station generates on the display device a display illustrating the first set of values and the second set of values.

According to one aspect of the invention, the network management application causes the network management station to retrieve the first set of values and the second set of values from the integrated router/hub in response to a single command generated by a user.

According to another aspect of the invention, the network management application causes the network management station to retrieve the first set of values and the second set of values by transmitting a single request message to the integrated router/hub.

In one embodiment, the display is a single window on the display device. The display includes a first chart generated based on the first set of values and a second chart generated based on the second set of values.

According to another embodiment of the invention, a network management station for use in a network system that includes a plurality of local area networks is provided. A first network of the plurality of networks includes the network management station and an integrated router/hub.

The network management station includes a processor, a display device, a user input device, and a memory containing a network management application. The network management application includes a series of instructions. The processor is coupled to the memory. The processor executes the series of instructions. The display device is coupled to the processor. The user input device is coupled to the processor. The processor generates a display on the display device based on (1) the series of instructions and (2) user input on the user input device.

The display illustrates a plurality of statistics including at least one statistic generated based on a first set of values and at least one statistic generated based on a second set of values. The first set of values relate to a first set of messages communicated between a plurality of stations in the first network through the integrated router/hub. The second set of values relate to a second set of messages communicated between the first local area network and a second local area network of the plurality of local area networks through the integrated router/hub.

According to one aspect of the invention, the display includes an interval selector and a chart. The interval selector allows a user to select a time interval, such as a week. The time interval includes a plurality of time periods. For example, a time interval of a week includes seven days. The chart illustrates a value of a statistic of the plurality of statistics for each time period of the plurality of time periods.

According to another aspect of the invention, the integrated router/hub has a plurality of ports and the display includes a plurality of partition status indicators. Each partition status indicator corresponds to a corresponding port of the plurality of ports. Each partition status indicator has a first visual state when the corresponding port is partitioned from the network system. Each partition status indicator has a second visual state when the corresponding port is not partitioned from the network system. The second visual state of the partition status indicator is different from the first visual state of the partition status indicator.

The display may also include a plurality of link status indicators. Each link status indicator corresponds to a corresponding port of the plurality of ports. Each link status indicator has a first visual state when the corresponding port is linked to a device on the network system. Each link status indicator has a second visual state when the corresponding port is not linked to a device on the network system. The second visual state of the link status indicator is different from the first visual state of the link status indicator.

According to another aspect of the invention, one or more trap messages are generated when an error occurs during communication of the first set of messages or the second set of messages. The display includes a trap indicator region. The network management station detects the one or more trap messages. The trap indicator region has a first visual state before the network management station detects the one or more trap messages. The trap indicator region has a second visual state after the network management station detects the one or more trap messages. The second visual state of the trap indicator region is different from the first visual state of the trap indicator region. Optionally, the display includes a status area. A message is displayed in the status area when the network management station detects the one or more trap messages.

According to another embodiment of the invention, a method for use in a wide area network that includes an integrated router/hub is provided. The method includes the step of causing the integrated router/hub to route a plurality of messages between a plurality of devices. This step includes causing the integrated router/hub to route a first set of messages between a plurality of stations on a first local area network and causing the integrated router/hub to route a second set of messages between the first local area network and a second local area network.

The integrated router/hub stores a first set of values responsive to routing the first set of messages. The integrated router/hub stores a second set of values responsive to routing the second set of messages.

A network management station executes a network management application to cause the network management station to perform the steps of receiving user input requesting information about the router/hub, requesting from the integrated router/hub the first set of values and the second set of values responsive to the user input, receiving from the integrated router/hub the first set of values and the second set of values, and generating a display based upon both the first set of values and the second set of values.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
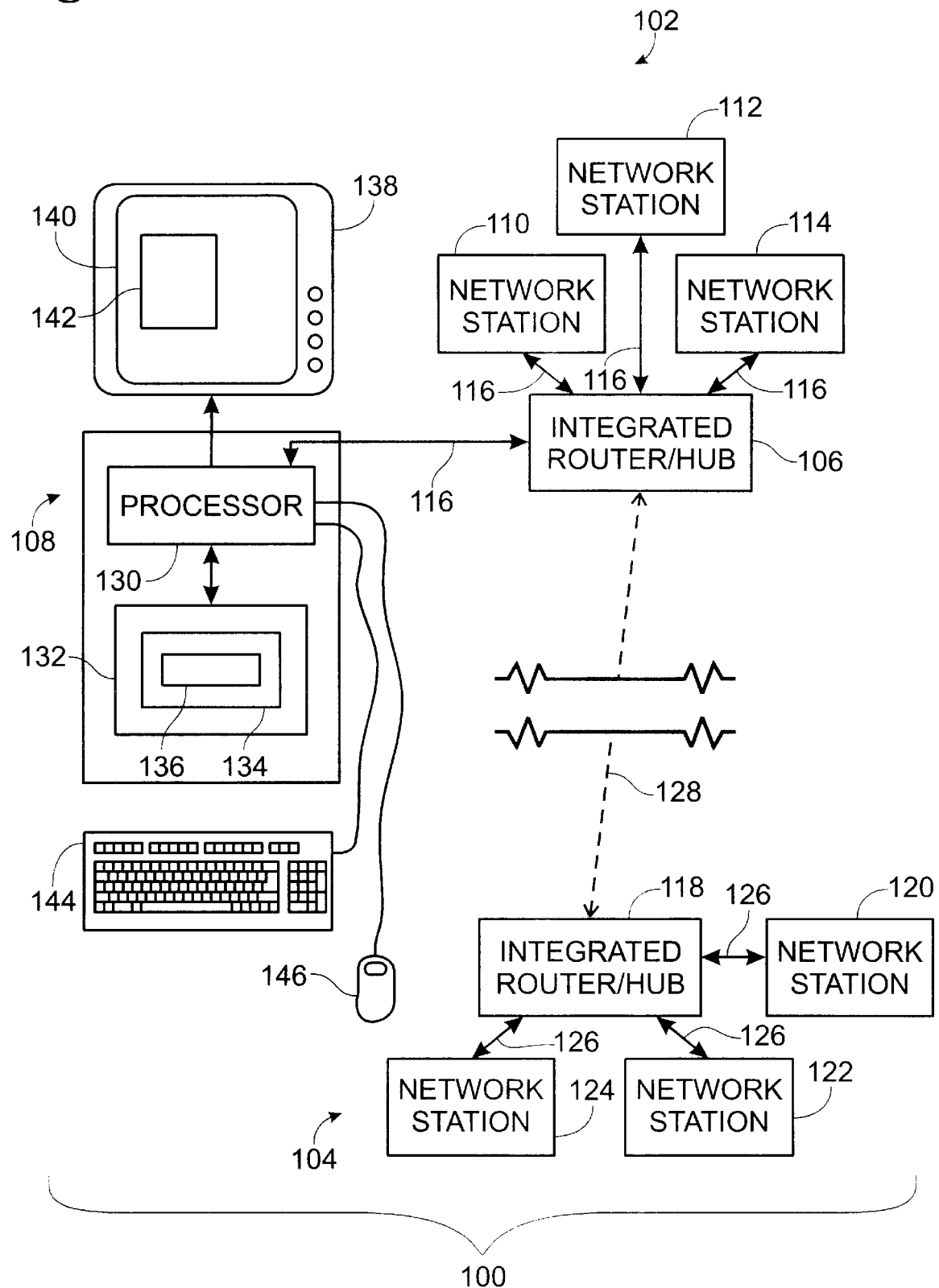
FIG. 1 illustrates a wide area network in which a local area networked is linked to another local area network through an integrated router/hub according to an embodiment of the present invention.

Referring to FIG. 1, it illustrates an exemplary network system 100 according to an embodiment of the invention. Network system 100 includes two local area networks 102 and 104. Local area network 102 includes an integrated router/hub 106 coupled to four network stations 108, 110, 112 and 114 by a plurality of network connection lines 116. Local area network 104 includes an integrated router/hub 118 coupled to three network stations 120, 122 and 124 by a plurality of connection lines 126.

LOCAL MESSAGES

The stations which belong to a common LAN, such as network stations 108, 110, 112 and 114, can communicate with each other by sending messages through an integrated router/hub on the LAN (e.g. integrated router/hub 106). Each message must specify the station to which the message should be sent (the "destination network station"). Integrated router/hub 106 determines the destination network station from each message and transmits each message to the appropriate network station. For example, network station 114 can communicate with network station 110 by sending a message to integrated router/hub 106 which designates network station 110 as the destination network station. Upon receipt of the message, integrated router/hub 106 determines that network station 110 is the destination network station, and transmits the message to network station 110.

Because all of the network stations 108, 110, 112 and 114 belong to the same local area network 102, integrated router/hub 106 transmits all of the messages between the stations according to a local area network protocol. As integrated router/hub 106 processes the messages sent between the network stations of local area network 102, integrated router/hub 106 stores statistics relating to the communications. For example, integrated router/hub 106 may maintain statistics on how many local messages are being sent by each network station and how many of the messages from each station contain transmission errors.

Integrated router/hub 106 also stores statistics relating to the configuration of LAN 102. For example, each of stations 108, 110, 112 and 114 may be connected to a different port on integrated router/hub 106. Integrated router/hub 106 stores data indicating which station is connected to which port, which ports are linked, and which ports have been partitioned from the network.

REMOTE MESSAGES

Integrated router/hub 106 is connected to integrated router/hub 118 through an inter-LAN connection 128. Consequently, stations which belong to LAN 102 can communicate with devices which belong to LAN 104, and visa versa. Communication between LANs involves sending a message from the source station to a first integrated router/hub in the same LAN as the source station via a local communication line, sending the message from the first integrated router/hub to a second integrated router/hub that belongs to the same LAN as the destination network station via an inter-LAN communication line, and transmitting the message from the second integrated router/hub to the destination station via a local communication line. As with local messages, to be properly routed, inter-LAN messages must specify the appropriate destination network stations.

For example, a user of station 110 may cause station 110 to generate a message for station 124. Station 110 transmits the message to integrated router/hub 106 over local communication line 116. The message specifies station 124 as the destination station. Integrated router/hub 106 determines that the designated destination station resides in a network corresponding to integrated router/hub 118. Integrated router/hub 106 then transmits the message to integrated router/hub 118 over inter-LAN connection 128. Integrated router/hub 118 inspects the message to determine that the destination station is station 124. Integrated router/hub 118 then transmits the message to station 124 over local communication line 126.

All messages sent between integrated router/hub 106 and integrated router/hub 118 are transmitted according to a remote message protocol. As integrated router/hub 106 routes remote messages to integrated router/hub 118, integrated router/hub 106 stores statistics relating to the remote messages. For example, integrated router/hub 106 may maintain statistics on how many remote messages are being sent by each network station on network 102 and how many of the remote messages from each station contain transmission errors.

NETWORK MANAGEMENT STATION

Station 108 is a network management station configured to execute a network management application which allows a user to monitor and manage network system 100. Station 108 includes a processor 130, a memory 132, a display device 138 and one or more user input devices such as keyboard 144 and mouse 146.

Memory 132 is coupled to processor 130 and stores the network management application 134. Memory 132 may be any mechanism capable of storing digital information, such as random access memory, read only memory, magnetic memory, optical memory, or any combination thereof. Stored within memory 132 is the network management application 134. A portion of the network management application 134 consists of instructions 136 for generating a display 142 on a screen 140 of display device 138.

Processor 130 executes the network management application 134 and generates display 142 on screen 140 responsive to instructions 136. Display 142 includes information about the local messages and the remote messages processed by integrated router/hub 106 ("traffic information"). The specific contents of one embodiment of display 142 will be described in greater detail below with reference to FIG. 3.

The traffic information displayed in display 142 is gathered by network management station 108 from integrated router/hub 106 responsive to input entered through operation of keyboard 144 and/or mouse 146. The steps involved in generating display 142 shall now be described in greater detail with reference to FIG. 2.

Figure 2:
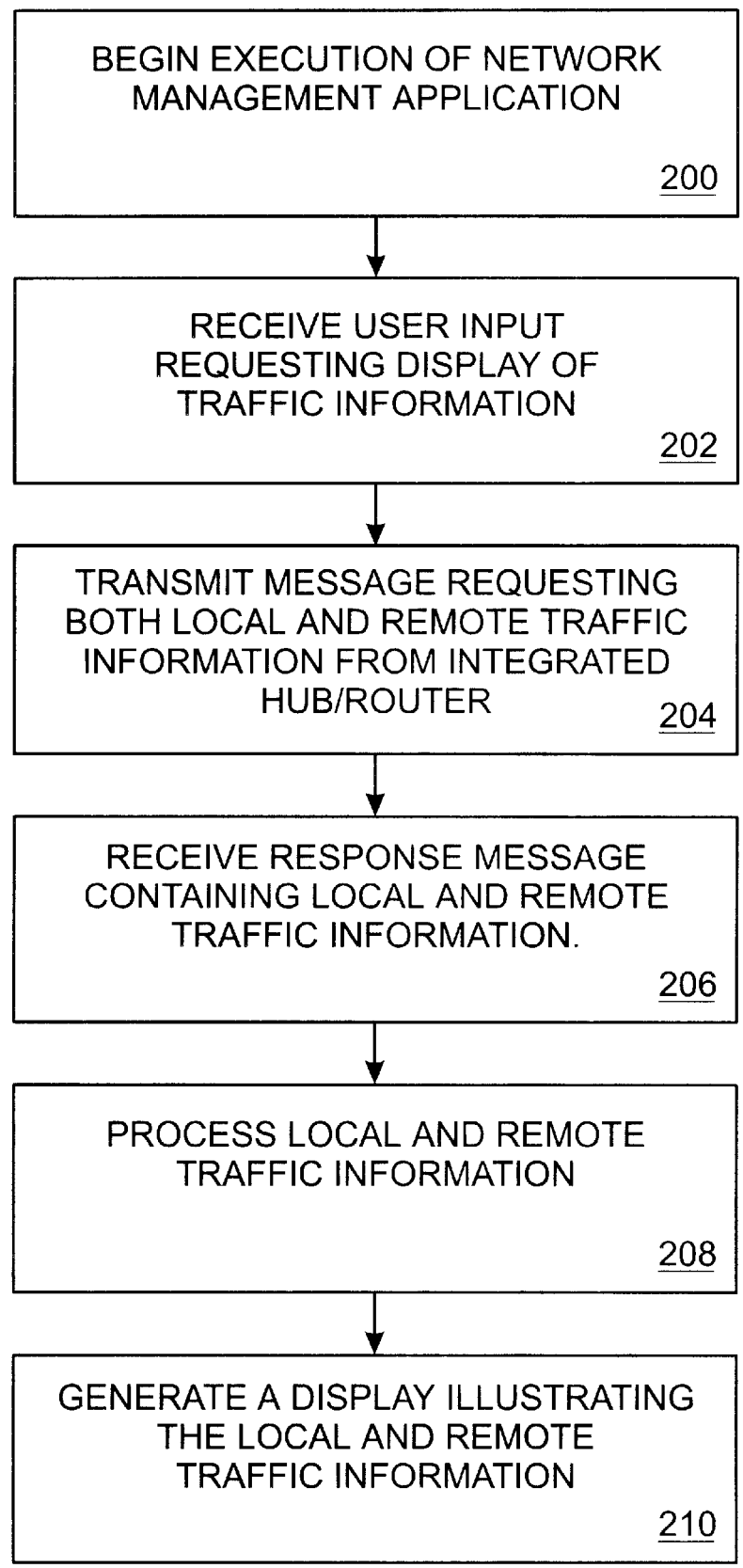
FIG. 2 illustrates a flow chart of the steps for displaying the local and remote message statistics of an integrated router/hub according to an embodiment of the invention.

FIG. 2 illustrates a flow chart for displaying information about the local and remote messages processed by integrated router/hub 106. At step 200, processor 130 begins executing network management application 134. At step 202, processor 130 receives user input requesting the display of traffic information associated with integrated router/hub 106. This user input may be entered by a user through either keyboard 144 or mouse 146. The user input may be entered, for example, by a user selecting an indication (such as an icon or text identifier) of integrated router/hub 106. The selection may be performed from a menu, or by clicking a button on mouse 146 when an arrow associated with mouse 146 is placed on a visual depiction of integrated router/hub 106 generated on screen 140. These are only examples of how a user may enter input to indicate a desire to see information about the local and remote messages associated with integrated router/hub 106. The present invention is not restricted to any particular user input process.

At step 204, processor 130 transmits a message to integrated router/hub 106 that requests both local and remote message information from integrated router/hub 106. As mentioned above, integrated router/hub 106 stores this information while integrated router/hub 106 handles the local and remote message routing. In response to the information request message, integrated router/hub 106 retrieves the stored traffic information and sends a response message to network management station 108 containing the traffic information pertaining to both local and remote messages. At step 206, station 108 receives the response message from integrated router/hub 106.

Typically, the raw data maintained by integrated router/hub 106 will not, in its raw format, convey useful information to the user. For example, integrated router/hub 106 may track, from a particular point in time, the total number of local and remote messages sent by each of stations 108, 110, 112 and 114. These number totals may be of less interest than, for example, statistics which indicate the network usage of one station relative to the total network usage of all of the stations. Consequently, at step 208, station 108 processes the raw statistics contained in the message from integrated router/hub 106 to create derived statistics which may be of interest to a user.

For example, a user may desire to know the percentage of local messages sent by station 110 relative to the total number of local messages processed by integrated router/hub 106. Integrated router/hub 106 typically will not maintain this statistic. However, the statistic may be derived from the local message information that integrated router/hub 106 does maintain. Specifically, the total number of local messages processed by integrated router/hub 106 may be determined by summing the total number of local messages sent by each of stations 108, 110, 112 and 114. The ratio of local messages sent by station 110 to total local messages sent on network 102 may then be determined by dividing the total number of local messages sent by station 110 by the total number of local messages processed by integrated router/hub 106. A percentage may be obtained by multiplying the result by one hundred.

Once station 108 receives the response message from integrated router/hub 106 and has calculated all required derived statistics, processor 130 executes the instructions 136 in the network management application 134 that cause display 142 to be generated on display device 138. The step of generating the display is performed at step 210.

AN EXEMPLARY DISPLAY

Figure 3:
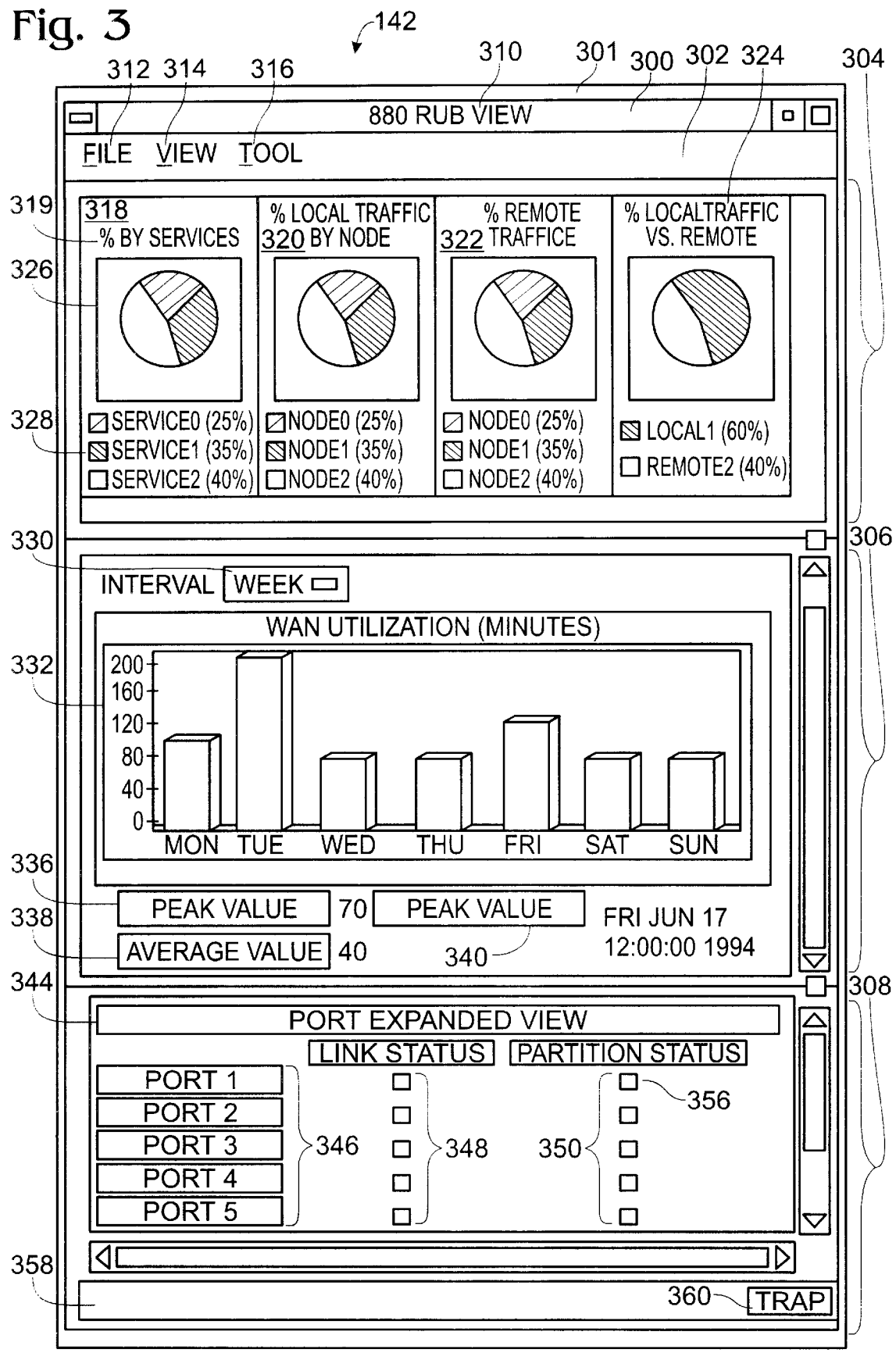
FIG. 3 illustrates a display that communicates both the local and remote message statistics of an integrated router/hub according to an embodiment of the invention.

Referring now to FIG. 3, it illustrates an exemplary display 142 that may be generated responsive to the execution of instructions 136. Display 142 is preferably contained within a single window 301 that generally includes a title bar 300, a menu bar 302, and a plurality of display regions 304, 306 and 308.

The title bar 300 indicates a title 310 for the window containing display 142. The menu bar 302 includes a plurality of selectable command options 312, 314 and 316. The user may select a command option from menu bar 302 by either entering a keystroke corresponding to the command option on keyboard 144, or by selecting the command option through operation of mouse 146. Preferably, the keystroke corresponding to a command option is indicated by the visual depiction of the command option. For example, the "F" of the command option 312 "File" may be underlined to indicate that command option 312 may be selected by pressing Alt-"F" on keyboard 144.

Upon selection of a command option from menu bar 302, a second set of command options corresponding to the selected command option is displayed. A user may select a command option from this second set of command options using the command option selection procedure described above. When a command option from the second set of command options is selected, processor 130 performs an operation corresponding to the selected command option.

For example, the set of command options corresponding to "View" may include "Load Preferences", "Save" and "Quit". Selection of "Load Preferences" allows a user to specify values for user interface configurable features. Selection of "Save" allows a user to save a screen shot of display 142. "Save" may have a subset of commands which allow a user to either save the screen shot to a file, or send the screen shot to a printer. Selection of "Quit" may terminate the program that generates display 142, or merely remove display 142 from the screen.

The set of command options corresponding to "View" may allow a user to select which statistics are displayed, and the format in which they are displayed. For example, one command option may cause a statistic to be displayed using pie charts, while another command causes the statistic to be displayed using bar graphs. The set of command options corresponding to "Tools" may include "Set Thresholds", "Partition Port" and "Configure". "Set Thresholds" allows a user to specify limits that will cause a trap to be generated. "Partition Port" allows a user to cause a port on the integrated router/hub to be partitioned. "Configure" launches a configuration tool that enables a user to configure the integrated router/hub.

Display region 304 includes a plurality of statistics displays 318, 320, 322 and 324. In the illustrated embodiment, each of statistics displays 318, 320, 322 and 324 includes a title 319, a chart section 326, and a text section 328. The title 319 indicates the particular statistic illustrated in the statistics display. For example, the title of statistics display 320 is "% of Local Traffic by Node" to indicate that the statistic illustrated in statistics display 320 is the percentage of the total number of local messages handled by a particular integrated router/hub attributable to each station in the local area network.

In the illustrated embodiment, the chart sections 326 of each of the statistics displays contains a pie chart. Pie charts are particularly useful for illustrating percentages. For example, the pie chart of statistics display 320 illustrates what percentage of the total number of local messages handled by an integrated router/hub are attributable to each of three stations.

While charts work well to generally illustrate statistical relationships, it is often desirable to know exact statistics. For example, a slice in a pie chart may appear to consist of roughly one third of the pie, while it actually represents thirty-five percent. The text section 328 of each statistics display provides the exact numbers of the statistics illustrated in the charts.

In the preferred embodiment, a user may obtain more information about a statistic by selecting the representation of the statistic in the chart section 326. For example, each slice of the pie chart in statistics display 320 represents the percentage of local messages that were sent by a particular station. Typically, this percentage information will have been derived from other information, such as the total number of local messages processed by the integrated router/hub and the total number of local messages sent by the particular station. For a user to view the data from which the percentage information was derived, the user may select the relevant pie slice. The section operation may include, for example, clicking on the pie slice by operation of mouse 146. In response to the selection of a pie slice, a popup window (not shown) appears with more detailed information about the station that corresponds to the selected pie slice.

Significantly, display region 304 includes statistics displays relating to both the local messages and the remote messages processed by an integrated router/hub. For example, statistics displays 318 and 322 illustrate remote traffic by service type and remote traffic by originating node, respectively, while statistics display 322 illustrates local traffic by originating node. Service type means, for example, the type of service being performed through messages, such a E-mail transmissions or file transfers. Statistics display 324 illustrates the total traffic by type (local or remote).

Display region 306 includes an interval selector 330, a chart region 332 and statistic indicators 336, 338 and 340. Interval selector 330 is used to select a time interval, such as day, week or month. Chart region 332 charts a particular statistic for the selected interval. Statistics indicators 336, 338 and 340 indicate particular values of interest for the particular statistic.

In the illustrated embodiment, the statistic illustrated in display region 306 is WAN utilization. Chart region 332 includes a bar chart illustrating the utilization of the WAN over the selected interval (one week). Statistics indicators 336, 338 and 340 illustrate the peak value, average value, and peak time of WAN utilization.

WAN utilization is determined from remote traffic information stored by an integrated router/hub. However, since network management application 134 also acquires local traffic information from an integrated router/hub, display region 306 may alternatively display LAN utilization statistics. Display region 306 may even display integrated router/hub utilization statistics involving information about both the local and remote messages processed by an integrated router/hub.

Display region 308 displays information about the configuration of the integrated router/hub itself, rather than the messages handled by the integrated router/hub. Display region 308 includes a title bar 344, a plurality of port indicators 346, link status indicators 348 and partition status indicators 350. Title bar 344 indicates the type of information illustrated in display region 308. Each of port indicators 346 corresponds to a port on the integrated router/hub. A window with more detailed information about a particular port is displayed when the port indicator corresponding to the port is selected by a user.

Link status indicators 348 indicate the link status of the ports indicated by port indicators 346. Preferably, link status indicators 348 have one visual state (e.g. a certain color) to indicate that the corresponding port is linked to a networked device, and a different visual state (e.g. a different color) to indicate that the corresponding port is not linked to a networked device.

Partition status indicators 350 indicate whether the corresponding ports have been partitioned from the network system. When a port is partitioned from a network, the devices connected to the integrated router/hub through that port are no longer able to communicate with other devices on the network. A port may be partitioned, for example, if a device on the port is generating a large number of messages with errors. Similar to link status indicators 348, partition status indicators 350 have one visual state (e.g. a certain color) to indicate that the corresponding port is partitioned, and a different visual state (e.g. a different color) to indicate that the corresponding port is not partitioned.

According to an alternative embodiment, partition status indicators 350 may be controls to create or remove a partition as well as indicators to indicate when a port has been partitioned. For example, a user may select partition indicator 356 to partition a device connected to "Port 1".

Status area 358 is the area in which messages are displayed to notify the user of certain events. For example, if a particular user is partitioned from the network, then a message may be displayed in status area 358 notifying the user of the network management application 134 that the particular user was partitioned. Status area 358 may also be used in conjunction with trap indication region 360 to notify the user of trap messages.

Trap indication region 360 indicates the detection of trap messages received by the integrated router/hub. Trap messages are typically messages that indicate a particular type of error. In the preferred embodiment, trap indication region 360 has on visual state in the absence of trap messages, and a different visual state upon the detection of trap messages. For example, trap indication region 360 may blink red upon the detection of trap messages. By selecting the trap region, a window (not shown) that contains detailed information about the detected traps appears. The trap indication region 360 may used, for example, to indicate that a particular port should be partitioned from the network system.

By analyzing the way a particular station is using the network, it is often possible to infer what the user of the station is doing. For example, a user that has a high message transfer rate may be performing unauthorized downloads if the messages are related to file transfer services. However, it is more difficult to predict the activity of a user based either only on local message statistics or only on remote message statistics. Unlike prior network management programs, network management application 134 acquires both local and remote message information from an integrated router/hub. Based on both types of information, user activity may be inferred more accurately. According to one embodiment of the invention, network management application 134 is configured to generate a user activity assessment based on the local and remote messaging activity of the user. The assessment may be, for example, a prediction as to whether a user has performed unauthorized file transfers or is otherwise using the network in an unauthorized manner.

As is evident by the foregoing, numerous benefits result from the acquisition and display of local and remote messaging statistics of an integrated router/hub by a single network management program. The remote and local statistics can be compared, correlated and compared to provide a more complete picture of network utilization. With this more complete picture, a network manager may be able to better predict the needs of a network, as well as detect undesirable network activity. Further, the network management program treats an integrated router/hub as the single, dual-purpose device that it is, rather than focus on only one or the other aspects of an integrated router/hub.

While specific embodiments of the present invention have been described, various modifications and substitutions will become apparent to one skilled in the art by this disclosure. Such modifications and substitutions are within the scope of the present invention, and are intended to be covered by the following claims.

What is claimed is:

1. A network management station for use in a network system that includes a plurality of local area networks, wherein a first network of the plurality of local area networks includes the network management station and an integrated router/hub, the network management station comprising:

a memory containing a network management application, the network management application comprising a series of instructions;

a processor coupled to the memory, the processor executing the series of instructions;

a display device coupled to the processor;

a user input device coupled to the processor, the processor generating a display on the display device based on the series of instructions and user input on said user input device;

wherein the network management application causes the network management station to retrieve a first set of values and a second set of values from said integrated router/hub in response to a single command generated by a user;

wherein said display illustrates a plurality of statistics, including at least one statistic generated based on said first set of values and at least one statistic generated based on said second set of values;

wherein the first set of values relate to a first set of messages communicated between a plurality of stations in said first network through said integrated router/hub; and wherein the second set of values relate to a second set of messages communicated between said first network and a second network of the plurality of local area networks through said integrated router/hub.

2. A network comprising:

a first integrated router/hub having a first set of one or more network stations coupled thereto to form a first local area network;

a second integrated router/hub coupled to a second set of one or more network stations to form a second local area network, wherein the first and second local area networks are coupled together;

a first network management station coupled to the first local area network that executes a first network management application to concurrently display a first set of values related to messages communicated between the first and second local area networks and a second set of values related to messages communicated within the first local area network, the first set of values and the second set of values being retrieved from the first integrated router/hub in response to a single command from the first network management application.

3. The network of claim 2, wherein the first set of values is displayed as a first chart and the second set of values is displayed as a second chart within a common window displayed by the first network management station.

4. The network of claim 2 further comprising a second network management station coupled to the second integrated router/hub that executes a second network management application to concurrently display the first set of values related to messages communicated between the first and second local area networks and a third set of values related to messages communicated within the second local area network, the first set of values and the third set of values being retrieved from the second integrated router/hub in response to a single command from the second network management application.

5. The network of claim 4, wherein the first set of values is displayed as a first chart and the third set of values is displayed as a third chart within a shared window displayed by the second network management station.

6. A network management station for use in a first local area network having a plurality of network stations and a first integrated router/hub, the network management station comprising:

a bus;

a processor coupled to the bus;

a memory coupled to the bus, the memory storing a network management application executable by the processor; and a display device coupled to the bus that concurrently display a first set of values related to messages communicated between the first local area network and a second local area network and a second set of values related to messages communicated within the first local area network, the first set of values and the second set of values being retrieved from the first integrated router/hub in response to a single command from the network management application.

7. The network management station of claim 6, wherein the first set of values is displayed as a first chart and the second set of values is displayed as a second chart.

8. A method for managing a local area network comprising the steps of:

causing a first integrated router/hub included in a first local area network to store a first set of data related to messages communicated between stations included in the first local area network and a second set of data related to messages communicated between stations of the first local area network and stations included in a second local area network coupled to the first local area network;

executing a first network management application on a network management station that is coupled to the first local area network;

retrieving the first set of data and the second set of data from the first integrated router/hub in response to a single command performed by the first network management application; and displaying the first set of data and the second set of data concurrently on a display device coupled to the first network management station.

9. The method of claim 8, wherein the step of displaying further comprises the steps of:

displaying the first set of data as a first chart; and displaying the second set of data as a second chart;

wherein the first chart and the second chart are displayed concurrently on a single display device.

10. The method of claim 9, wherein the first chart and the second chart are displayed in a common window on the display device.

11. The method of claim 8 further comprising the steps of:

causing a second integrated router/hub that is coupled to the second local area network to store the second set of data and a third set of data related to messages communicated between stations of the second local area network;

executing a second network management application on a network management station coupled to the second local area network;

retrieving the second set of data and the third set of data from the second integrated router/hub in response to a single command performed by the second network management application; and displaying the second set of data and the third set of data concurrently on a display device coupled to the second network management station.

12. A computer-readable medium having stored thereon a plurality of sequences of instructions including sequences of instructions which, when executed by a processor cause the processor to perform the steps of:

causing a first integrated router/hub that is included in a first local area network to store a first set of data related to messages communicated between stations included in the first local area network and a second set of data related to messages communicated between stations of the first local area network and stations included in a second local area network coupled to the first local area network;

executing a first network management application on a network management station that is coupled to the first local area network;

retrieving the first set of data and the second set of data from the first integrated router/hub in response to a single command performed by the first network management application; and displaying the first set of data and the second set of data concurrently on a display device coupled to the first network management station.

13. The computer-readable medium of claim 12, wherein the step of displaying further comprises the steps of:

displaying the first set of data as a first chart; and displaying the second set of data as a second chart;

wherein the first chart and the second chart are displayed concurrently on a single display device.

14. The computer-readable medium of claim 13, wherein the first chart and the second chart are displayed in a common window on the display device.

15. An apparatus for managing a local area network comprising:

means for causing a first integrated router/hub that is included in a first local area network to store a first set of data related to messages communicated between stations included in the first local area network and a second set of data related to messages communicated between stations of the first local area network and stations included in a second local area network coupled to the first local area network;

means for executing a first network management application on a network management station that is coupled to the first local area network;

means for retrieving the first set of data and the second set of data from the first integrated router/hub in response to a single command performed by the first network management application; and means for displaying the first set of data and the second set of data concurrently on a display device coupled to the first network management station.

16. The apparatus of claim 15, wherein the means for displaying further comprises:

means for displaying the first set of data as a first chart; and means for displaying the second set of data as a second chart;

means for wherein the first chart and the second chart are displayed concurrently on a single display device.

17. The apparatus of claim 16 further comprising:

means for causing a second integrated router/hub that is coupled to the second local area network to store the second set of data and a third set of data related to messages communicated between stations of the second local area network;

means for executing a second network management application on a network management station coupled to the second local area network;

means for retrieving the second set of data and the third set of data from the second integrated router/hub in response to a single command performed by the second network management application; and means for displaying the second set of data and the third set of data concurrently on a display device coupled to the second network management station.

* * * * *